(12) United States Patent
Dai

(10) Patent No.: US 10,635,946 B2
(45) Date of Patent: Apr. 28, 2020

(54) EYEGLASS POSITIONING METHOD, APPARATUS AND STORAGE MEDIUM

(71) Applicant: Ping An Technology (Shenzhen) Co., Ltd., Shenzhen, Guangdong (CN)

(72) Inventor: Lei Dai, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/337,938

(22) PCT Filed: Oct. 31, 2017

(86) PCT No.: PCT/CN2017/108756
§ 371 (c)(1),
(2) Date: Mar. 29, 2019

(87) PCT Pub. No.: WO2019/061658
PCT Pub. Date: Apr. 4, 2019

(65) Prior Publication Data
US 2019/0362193 A1 Nov. 28, 2019

(30) Foreign Application Priority Data
Sep. 30, 2017 (CN) .......................... 2017 1 0915085

(51) Int. Cl.
*G06K 9/00* (2006.01)
*G06K 9/62* (2006.01)

(52) U.S. Cl.
CPC ....... *G06K 9/6267* (2013.01); *G06K 9/00228* (2013.01); *G06K 9/00281* (2013.01); *G06K 9/6256* (2013.01); *G06K 9/6262* (2013.01)

(58) Field of Classification Search
CPC ...... G06N 7/005; G06N 20/00; G06N 3/0454; G06N 3/02; G06N 3/0445; G06N 3/084;
(Continued)

(56) References Cited

U.S. PATENT DOCUMENTS 6,714,665 B1* 3/2004 Hanna ..................... G06K 9/00
382/106
9,111,147 B2* 8/2015 Thornton ................. H04N 7/18
(Continued)

FOREIGN PATENT DOCUMENTS

CN    102163288 A    8/2011
CN    105205482 A    12/2015
(Continued)

OTHER PUBLICATIONS

Du Jinli, CN-106778451-A: Glasses detection method for face detection, May 31, 2017 [retrieved Oct. 11, 2019], Abstract only, 2 pages. (Year: 2017).*
(Continued)

*Primary Examiner* — Andrew M Moyer
*Assistant Examiner* — Dennis Rosario

(57) ABSTRACT

The present application provides an eyeglass positioning method. The method includes: acquiring a real-time image shot by a shooting apparatus, and extracting a real-time face image from the real-time image using a face recognition algorithm; recognizing whether the real-time face image includes eyeglasses using a predetermined first classifier, and outputting a recognition result; and positioning the eyeglasses in the real-time face image using a predetermined second classifier and outputting a positioning result when the recognition result is that the real-time face image includes the eyeglasses. The present application also provides an electronic apparatus and a computer readable storage medium. The present application adopts two classifiers to detect images in eyeglass regions in the face images, thereby enhancing precision and accuracy of eyeglass detection.

11 Claims, 3 Drawing Sheets

Acquiring a real-time image shot by a shooting apparatus, and extracting a real-time face image from the real-time image using a face recognition algorithm — S10

Recognizing whether the real-time face image includes eyeglasses using a predetermined first classifier, and outputting a recognition result — S20

Positioning the eyeglasses in the real-time face image using a predetermined second classifier and outputting a positioning result when the recognition result is that the real-time face image includes the eyeglasses — S30

(58) Field of Classification Search
CPC ...... G06N 3/006; G06N 3/0472; G06N 3/088;
G06N 3/126; G06N 5/046; G06K 9/6263;
G06K 9/00832; G06K 9/00362; G06K
9/00281; G06K 9/6228; G06K 9/00369;
G06K 9/00671; G06K 9/00288; G06K
9/00845; G06K 9/00255; G06K 9/00268;
G06K 9/00221; G06K 9/00228; G06K
9/00597; G06K 9/00604; G06K 9/0061;
G06K 9/00275; G06F 3/013; G06F 21/32;
G06T 2207/30201; G06T 7/73; H04N
13/383; H04N 5/23219
See application file for complete search history.

(56) References Cited

U.S. PATENT DOCUMENTS

| | | | | |
|---|---|---|---|---|
| 9,129,505 | B2* | 9/2015 | Breed | G08B 21/0407 |
| 9,779,492 | B1* | 10/2017 | Garnavi | G06T 7/0002 |
| 9,892,561 | B2* | 2/2018 | Choukroun | G06T 7/70 |
| 10,410,114 | B2* | 9/2019 | Kang | G06N 3/0454 |
| 2018/0268458 | A1* | 9/2018 | Popa | G06Q 30/02 |
| 2018/0352150 | A1* | 12/2018 | Purwar | G06K 9/00248 |

FOREIGN PATENT DOCUMENTS

| | | |
|---|---|---|
| CN | 105426963 A | 3/2016 |
| CN | 106407911 A | 2/2017 |

OTHER PUBLICATIONS

Lv et al., Data augmentation for face recognition, Mar. 22, 2017 [retrieved Oct. 11, 2019], Neurocomputing, vol. 230,pp. 184-196. Retrieved: https://www.sciencedirect.com/science/article/pii/S0925231216315016 (Year: 2017).*

Bayar et al., A Deep Learning Approach to Universal Image Manipulation Detection Using a New Convolutional Layer, Jun. 20-22, 2016 [retrieved Oct. 11, 2019], 4th ACM Workshop Info Hiding Multimedia Security, pp. 5-10. Retrieved: https://dl.acm.org/citation.cfm?id=2930786 (Year: 2016).*

Vicente et al, Driver Gaze Tracking and Eyes Off the Road Detection System, Aug. 2015 [retrieved Oct. 11, 2019], IEEE Trans on Intelligent Transportation Systems, vol. 16, Issue:4,pp. 2014-2027. Retrieved: https://ieeexplore.ieee.org/abstract/document/7053946 (Year: 2015).*

Vaquero et al, Attribute-based people search in surveillance environments, Dec. 7-8, 2009 [retrieved Oct. 11, 2019], 2009 Workshop on Applications of Computer Vision, 8 total pages. Retrieved: https://ieeexplore.ieee.org/abstract/document/5403131 (Year: 2009).*

First Office Action of Counterpart Chinese Patent Application No. 201710915085.X dated Jun. 15, 2018.

Notification to Grant Patent Right of counterpart Chinese Patent Application No. 201710915085.X dated Jul. 16, 2018.

* cited by examiner

EYEGLASS POSITIONING METHOD, APPARATUS AND STORAGE MEDIUM

CLAIM OF PRIORITY

The present application is based on the Paris Convention and claims priority to China Patent Application No. CN 201710915085.X, filed on Sep. 30, 2017 and entitled "Eyeglass Positioning Method, Apparatus and Storage Medium", which is hereby incorporated by reference in its entirety.

TECHNICAL FIELD

The present application relates to the technical field of computer visual processing, and particularly relates to an eyeglass positioning method, an electronic apparatus and a computer readable storage medium.

BACKGROUND

In the field of face recognition, many people wear eyeglasses and especially deep-frame eyeglasses, which leads to high similarity of face images with deep-frame eyeglasses and the inability of accurate face recognition during face recognition. At present, the method adopted by the industry is to remove eyeglass regions in the face images and then recognize the face images after removing the eyeglass regions. However, the key of this method is how to accurately determine the eyeglass regions in the face images.

Due to the influences of diversity of eyeglass shapes, image quality and other factors, there are many difficulties in eyeglass detection. For example, in the early detection of the eyeglasses, image processing and template matching methods are mainly used; a lower frame of the eyeglasses and a nose bridge of the eyeglasses are detected according to the discontinuous change of pixel gray values; and then, the eyeglasses are detected by the edge information of a region between two eyes. In the later detection of the eyeglasses, a three-dimensional Hough transformation method is mainly used to detect the eyeglasses. However, due to the influence of different light rays, images obtained by image processing and Hough method after imaging are excessively dependent on image edges. Thus, there is noise, and noise interference leads to the failure to obtain feature points or accurate feature points. Therefore, the detection accuracy is relatively low.

SUMMARY

The present application provides an eyeglass positioning method, an electronic apparatus and a computer readable storage medium for the main purpose of improving the accuracy of eyeglass positioning in face images.

To achieve the above purpose, the present application provides an electronic apparatus. The apparatus includes: a memory, a processor and a shooting apparatus. The memory includes an eyeglass positioning program and the eyeglass positioning program realizes, when executed by the processor, the following steps of:

acquiring a real-time image shot by a shooting apparatus, and extracting a real-time face image from the real-time image using a face recognition algorithm;

recognizing whether the real-time face image includes eyeglasses using a predetermined first classifier, and outputting a recognition result; and positioning the eyeglasses in the real-time face image using a predetermined second classifier and outputting a positioning result when the recognition result is that the real-time face image includes the eyeglasses.

In addition, to achieve the above purpose, the present application also provides an eyeglass positioning method, including:

acquiring a real-time image shot by a shooting apparatus, and extracting a real-time face image from the real-time image using a face recognition algorithm;

recognizing whether the real-time face image includes eyeglasses using a predetermined first classifier, and outputting a recognition result; and positioning the eyeglasses in the real-time face image using a predetermined second classifier and outputting a positioning result when the recognition result is that the real-time face image includes the eyeglasses.

In addition, to achieve the above purpose, the present application also provides a computer readable storage medium. The computer readable storage medium includes an eyeglass positioning program, and the eyeglass positioning program realizes any step in the above eyeglass positioning method when executed by the processor.

In the eyeglass positioning method, the electronic apparatus and the computer readable storage medium proposed by the present application, firstly, whether the face image includes eyeglasses is judged through the first classifier, and then the face image with eyeglasses is inputted into the second classifier to determine the position of the eyeglasses in the face image. The present application adopts two classifiers to detect the images in the eyeglass regions in the face images independent of image edges, thereby enhancing precision and accuracy of eyeglass detection.

BRIEF DESCRIPTION OF THE ACCOMPANYING DRAWINGS

Realization of the purpose, functional characteristics and advantages of the present application will be further described in combination with the embodiments and with reference to the drawings.

DETAILED DESCRIPTION OF ILLUSTRATED EMBODIMENTS

It should be understood that specific embodiments described herein are only used for explaining the present application, not used for limiting the present application.

Figure 1:
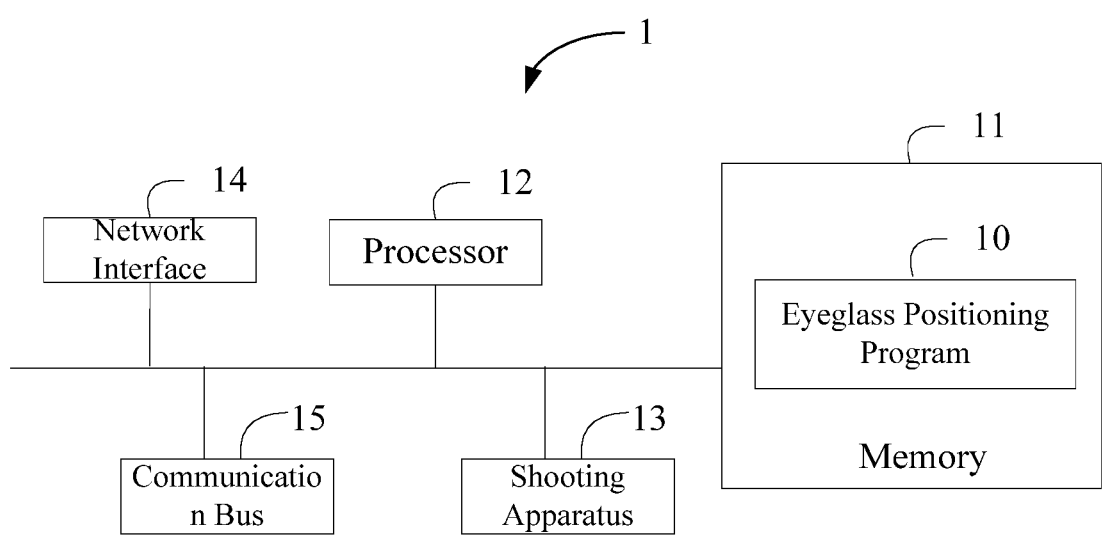
FIG. 1 is a hardware schematic diagram of a preferred embodiment of an electronic apparatus in the present application.

The present application provides an electronic apparatus 1. FIG. 1 shows a hardware schematic diagram of a preferred embodiment of an electronic apparatus in the present application.

In the present embodiment, the electronic apparatus 1 may be a server, an intelligent mobile phone, a tablet personal computer, a portable computer, a desktop computer and other terminal devices that have an operating function.

In the present embodiment, the electronic apparatus 1 may be a server with an eyeglass positioning program, an intelligent mobile phone, a tablet personal computer, a portable computer, a desktop computer and other terminal devices that have an operating function. The server may be a rack-mounted server, a blade server, a tower server or a cabinet server.

The electronic apparatus 1 includes a memory 11, a processor 12, a shooting apparatus 13, a network interface 14 and a communication bus 15.

The memory 11 includes at least one type of readable storage medium. The at least one type of readable storage medium may be, for example, a flash memory, a hard disk, a multimedia card, a card memory (such as SD or DX memory), a magnetic memory, a disk, a CD or other non-volatile storage media. In some embodiments, the memory 11 may be an internal storage unit of the electronic apparatus 1, such as a hard disk of the electronic apparatus 1. In some other embodiments, the memory 11 may also be an external storage device of the electronic apparatus 1, such as a plug-in hard disk, a smart media card (SMC), a secure digital (SD) card, a flash card, etc. equipped on the electronic apparatus 1.

In the present embodiment, the readable storage medium of the memory 11 is often used for storing the eyeglass positioning program 10, model files of a predetermined first classifier and second classifier, all kinds of data, etc. installed on the electronic apparatus 1. The memory 11 can also be used to temporarily store data that has been or will be outputted.

The processor 12 may be a central processing unit (CPU), a microprocessor or other data processing chips in some embodiments, and may be used to run program code or processing data stored in the memory 11, e.g., to execute the eyeglass positioning program 10.

The shooting apparatus 13 may be part of the electronic apparatus 1, and may also be independent of the electronic apparatus 1. In some embodiments, the electronic apparatus 1 is an intelligent mobile phone, a tablet personal computer, a portable computer and other terminal devices that have a camera. The shooting apparatus 13 is the camera of the electronic apparatus 1. In other embodiments, the electronic apparatus 1 may be a server. The shooting apparatus 13 is independent of the electronic apparatus 1, and is connected with the electronic apparatus 1 through a network. For example, the shooting apparatus 13 is installed in a specific place, such as an office place and a monitoring region, to shoot a target that enters the specific place in real time to obtain a real-time image. The shot real-time image is transmitted to the processor 12 through the network.

The network interface 14 may optionally include a standard wired interface and a wireless interface (such as WI-FI interface), and is generally used for establishing communication connection between the electronic apparatus 1 and other electronic devices.

The communication bus 15 is used for realizing connection communication between the components.

FIG. 1 only shows an electronic apparatus 1 with components 11-15, but it should be understood that, implementation of all the shown components is not required for alternative implementation for more or less components.

Optionally, the electronic apparatus 1 can also include a user interface. The user interface may include an input unit such as a keyboard. Optionally, the user interface can also include a standard wired interface and a standard wireless interface.

Optionally, the electronic apparatus 1 can also include a display. The display can also be properly called as a display screen or a display unit. In some embodiments, the display may be an LED display, an LCD, a touch control LCD and an organic light-emitting diode (OLED) touch device. The display is used for displaying information processed in the electronic apparatus 1 and for displaying a visual user interface.

Optionally, the electronic apparatus 1 can also include a touch sensor. A region provided by the touch sensor and used for touch operation for a user is called as a touch control region. In addition, the touch sensor described herein may be a resistive touch sensor, a capacitive touch sensor and the like. Moreover, the touch sensor not only includes a contact touch sensor, but also includes a proximity touch sensor. In addition, the touch sensor may be a single touch sensor, and may also be, for example, a plurality of sensors arranged in an array.

In addition, the area of the display of the electronic apparatus 1 may be or may not be the same as the area of the touch sensor. Optionally, the display and the touch sensor are laminated to form a touch display screen. The apparatus detects the touch control operation triggered by the user based on the touch display screen.

Optionally, the electronic apparatus 1 can also include a radio frequency (RF) circuit, a sensor, an audio frequency circuit and the like, which is not repeated herein.

In an apparatus embodiment shown in FIG. 1, the memory 11 as a computer storage medium stores an eyeglass positioning program 10, and the processor 12 realizes, when executing the eyeglass positioning program 10 stored in the memory 11, the following steps of:

acquiring a real-time image shot by the shooting apparatus 13, and extracting a real-time face image from the real-time image using a face recognition algorithm;

recognizing whether the real-time face image includes eyeglasses using a predetermined first classifier, and outputting a recognition result; and positioning the eyeglasses in the real-time face image using a predetermined second classifier and outputting a positioning result when the recognition result is that the real-time face image includes the eyeglasses.

When the shooting apparatus 13 shoots a real-time image, the shooting apparatus 13 transmits the real-time image to the processor 12. The processor 12 receives the real-time image, acquires the size of the real-time image, establishes a gray image with the same size as the real-time image, converts an acquired color image into the gray image and also creates a memory space. A histogram of the gray image is balanced to reduce information amount of the gray image and accelerate detection speed. Then, a training library is loaded; a face in the image is detected; and an object including face information is returned to obtain the data of the positions of the faces; the quantity of the faces is recorded; and finally, a face region is acquired and stored, thereby completing a face image extraction process. Specifically, the face recognition algorithm for extracting the face image from the real-time image may be a geometrical feature-based method, a local feature analysis method, a feature face method, an elastic model-based method and a neural network method.

Next, the predetermined first classifier is inputted through the face image extracted by the face recognition algorithm to judge whether the face image includes eyeglasses, wherein a training step of the predetermined first classifier includes:

respectively preparing a certain quantity of face pictures with eyeglasses and face pictures without eyeglasses as sample pictures and forming a first sample set; classifying and marking each sample picture according to whether the sample pictures include the eyeglasses; marking the sample pictures with eyeglasses using "with eyeglasses" or "1", and marking the sample pictures without eyeglasses using "without eyeglasses" or "0"; randomly extracting a first proportion (such as 50%) of sample pictures from the first sample set of the classified and marked samples as a training set; randomly extracting a second proportion (such as 50%) of sample pictures from the rest of the first sample set as a verifying set, i.e., taking 25% of sample pictures in the first sample set as the verifying set; and training a convolutional neural network using the training set to obtain the first classifier. To ensure the accuracy of the first classifier, the accuracy of the first classifier needs to be verified. The accuracy of the trained first classifier is verified by using the verifying set. If the accuracy is greater than or equal to a preset accuracy, the training is ended; or if the accuracy is less than the preset accuracy, the quantity of the sample pictures in the sample set is increased and the above steps are repeated.

It should be indicated that, the training step of the predetermined first classifier also includes: conducting the pretreatment operation such as scaling, tailoring, flipping and/or twisting on the sample pictures in the first sample set, and training the convolutional neural network through the pretreated sample pictures, thereby effectively improving the authenticity and the accuracy of model training.

For example, in an embodiment, picture pretreatment for each sample picture may include:

scaling the shorter side length of each sample picture to a first preset size (for example, 640 pixels) to obtain a corresponding first picture, and randomly tailoring a second picture of a second preset size on each first picture, such as a second picture of 256*256 pixels;

adjusting each predetermined preset type parameter value of each second picture as a corresponding standard parameter value to obtain a corresponding third picture according to various predetermined preset type parameters such as standard parameter values corresponding to color, brightness and/or contrast ratio, e.g., a standard parameter value a1 corresponding to color, a standard parameter value a2 corresponding to brightness and a standard parameter value a3 corresponding to contrast ratio, so as to eliminate unclear pictures caused by external conditions during the shooting of the sample pictures and improve the effectiveness of model training; and flipping each third picture in preset directions (such as horizontal and vertical directions), and twisting each third picture at a preset twisting angle (such as 30 degrees) to obtain a fourth picture corresponding to each third picture, i.e., each fourth picture is a training picture of a corresponding sample picture, wherein the role of flipping and twisting operations is to simulate various forms of pictures under actual business scenarios, and the scale of data sets can be increased through these flipping and twisting operations, thereby improving the authenticity and practicality of model training.

Assuming that the first classifier obtained through the above steps judges that the face image includes the eyeglasses, the face image is inputted into the predetermined second classifier. The eyeglass region in the face image is positioned and an eyeglass positioning result in the face image is outputted. It can be understood that if the face image does not include the eyeglass region in a judgment result outputted by the first classifier, the real-time image shot by the shooting apparatus 13 is obtained again and the subsequent steps are carried out.

It should be indicated that an acquiring process of the predetermined second classifier is as follows: preparing a preset quantity of sample pictures "with eyeglasses" to form a second sample set, or using the sample pictures marked using "with eyeglasses" or "1" in the first sample set in other embodiments. To simplify subsequent calculation, picture pretreatment is conducted on each sample picture. Specifically, the pretreatment step includes: converting each sample picture in the second sample set from a color image into a gray image; dividing the pixel value of each pixel point in the gray image by 255; standardizing the range of the pixel value of each pixel point from 0-255 to 0-1; and marking a preset quantity of marking points in the positions of the eyeglasses in the pretreated sample pictures, for example, marking 8 feature points on eyeglass frames in each sample picture: marking 3 feature points uniformly along an upper and a lower frames respectively, and marking 1 feature point respectively along a left and a right frames.

It is assumed that the second sample set has m sample pictures. The preset quantity of marking points that represent the positions of the eyeglasses in each sample picture are combined into a vector; and the vectors of all other (m−1) sample pictures are aligned with a reference vector by taking the vector in one sample picture as the reference vector to obtain a first average model about the position of the eyeglasses. Dimensionality reduction treatment is conducted on the first average model about the position of the eyeglasses through principal components analysis (PCA) to obtain a second average model about the position of the eyeglasses. The above alignment and dimensionality reduction are technologies that are learned by those skilled in the art and are not described herein.

The local features (such as HOG features) of each marking point are extracted from the second average model through a feature extraction algorithm, and the second average model about the position of the eyeglasses and the local features of each marking point are taken as the second classifier. In the present embodiment, the feature extraction algorithm is a scale-invariant feature transform (SIFT) algorithm. The SIFT algorithm extracts the local features of each feature point from the second average model, selects one feature point as the reference feature point and finds a feature point with the same or similar local feature as that of the reference feature point (for example, a difference value of the local features of two feature points is within a preset range). This principle is followed until all lip feature points are found. In other embodiments, the feature extraction algorithm may also be a speeded up robust features (SURF) algorithm, a local binary patterns (LBP) algorithm, a histogram of oriented gridients (HOG) algorithm and the like.

In the electronic apparatus 1 proposed by the present embodiment, firstly, whether the face image includes eyeglasses is judged through the first classifier, and then the face image with eyeglasses is inputted into the second classifier to determine the position of the eyeglasses in the face image. The present embodiment adopts two classifiers to detect the images in the eyeglass regions in the face images, thereby enhancing precision and accuracy of eyeglass detection.

Figure 2:
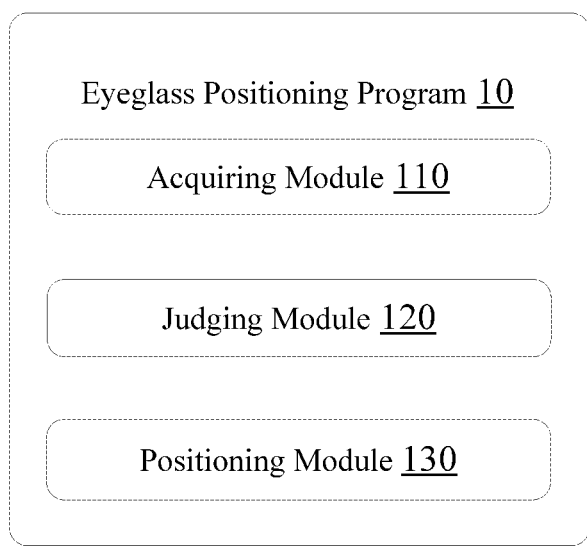
FIG. 2 is a module schematic diagram of a preferred embodiment of an eyeglass positioning program in FIG. 1.

In other embodiments, the eyeglass positioning program 10 can also be divided into one or more modules, and one or more modules are stored in the memory 11 and executed by the processor 12 to complete the present application. The modules called in the present application mean a series of computer program instruction sections that can complete specific functions. FIG. 2 shows a module schematic diagram of an eyeglass positioning program 10 in FIG. 1. The eyeglass positioning program 10 can be divided into: an acquiring module 110, a judging module 120 and a positioning module 130. Functions or operation steps realized by the modules 110-130 are similar to the above, and will not be described in detail herein. Exemplarily, for example:

the acquiring module 110 is used for acquiring a real-time image shot by a shooting apparatus 13, and extracting a real-time face image from the real-time image using a face recognition algorithm;

the judging module 120 is used for recognizing whether the real-time face image includes eyeglasses using a predetermined first classifier, and outputting a recognition result; and the positioning module 130 is used for positioning the eyeglasses in the real-time face image using a predetermined second classifier and outputting a positioning result when the recognition result is that the real-time face image includes the eyeglasses.

Figure 3:
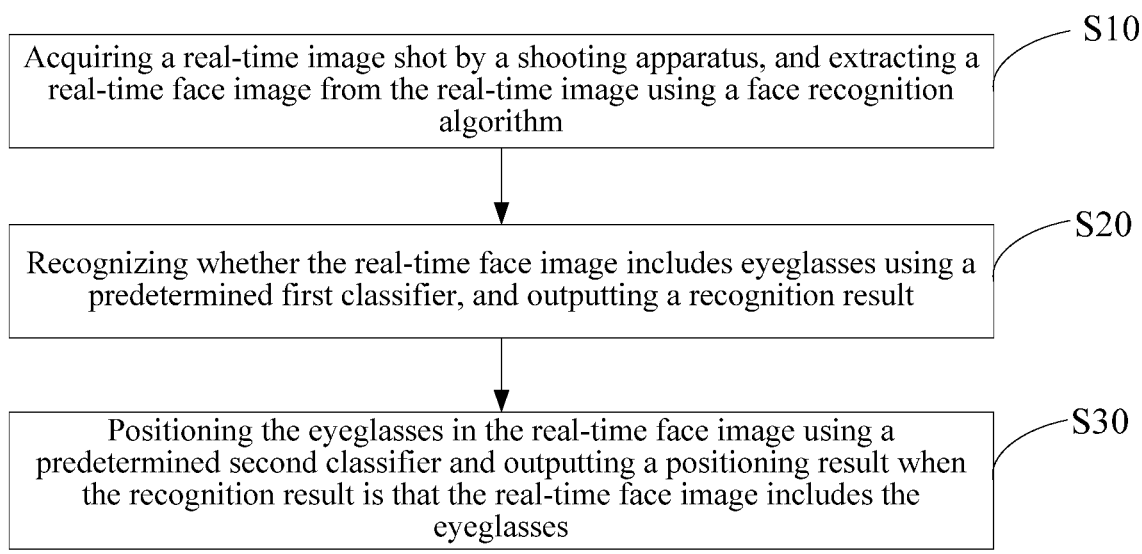
FIG. 3 is a flow chart of a preferred embodiment of an eyeglass positioning method in the present application.

In addition, the present application also provides an eyeglass positioning method. FIG. 3 shows a flow chart of a first embodiment of an eyeglass positioning method in the present application. The method may be executed by an apparatus. The apparatus may be realized by software and/or hardware.

In the present embodiment, the eyeglass positioning method includes steps S10-S30 of:

step S10: acquiring a real-time image shot by a shooting apparatus, and extracting a real-time face image from the real-time image using a face recognition algorithm;

step S20: recognizing whether the real-time face image includes eyeglasses using a predetermined first classifier, and outputting a recognition result; and step S30: positioning the eyeglasses in the real-time face image using a predetermined second classifier and outputting a positioning result when the recognition result is that the real-time face image includes the eyeglasses.

When the shooting apparatus shoots a real-time image, the shooting apparatus transmits the real-time image to the processor. The processor receives the real-time image, acquires the size of the real-time image, establishes a gray image with the same size as the real-time image, converts an acquired color image into the gray image and also creates a memory space. A histogram of the gray image is balanced to reduce information amount of the gray image and accelerate detection speed. Then, a training library is loaded; a face in the image is detected; and an object including face information is returned to obtain the data of the positions of the faces; the quantity of the faces is recorded; and finally, a face region is acquired and stored, thereby completing a face image extraction process. Specifically, the face recognition algorithm for extracting the face image from the real-time image may be a geometrical feature-based method, a local feature analysis method, a feature face method, an elastic model-based method and a neural network method.

Next, the predetermined first classifier is inputted through the face image extracted by the face recognition algorithm to judge whether the face image includes eyeglasses, wherein a training step of the predetermined first classifier includes:

respectively preparing a certain quantity of face pictures with eyeglasses and face pictures without eyeglasses as sample pictures and forming a first sample set; classifying and marking each sample picture according to whether the sample pictures include the eyeglasses; marking the sample pictures with eyeglasses using "with eyeglasses" or "1", and marking the sample pictures without eyeglasses using "without eyeglasses" or "0"; randomly extracting a first proportion (such as 50%) of sample pictures from the first sample set of the classified and marked samples as a training set; randomly extracting a second proportion (such as 50%) of sample pictures from the rest of the first sample set as a verifying set, i.e., taking 25% of sample pictures in the first sample set as the verifying set; and training a convolutional neural network using the training set to obtain the first classifier. To ensure the accuracy of the first classifier, the accuracy of the first classifier needs to be verified. The accuracy of the trained first classifier is verified by using the verifying set. If the accuracy is greater than or equal to a preset accuracy, the training is ended; or if the accuracy is less than the preset accuracy, the quantity of the sample pictures in the sample set is increased and the above steps are repeated.

It should be indicated that, the training step of the predetermined first classifier also includes: conducting the pretreatment operation such as scaling, tailoring, flipping and/or twisting on the sample pictures in the first sample set, and training the convolutional neural network through the pretreated sample pictures, thereby effectively improving the authenticity and the accuracy of model training.

For example, in an embodiment, picture pretreatment for each sample picture may include:

scaling the shorter side length of each sample picture to a first preset size (for example, 640 pixels) to obtain a corresponding first picture, and randomly tailoring a second picture of a second preset size on each first picture, such as a second picture of 256*256 pixels;

adjusting each predetermined preset type parameter value of each second picture as a corresponding standard parameter value to obtain a corresponding third picture according to various predetermined preset type parameters such as standard parameter values corresponding to color, brightness and/or contrast ratio, e.g., a standard parameter value a1 corresponding to color, a standard parameter value a2 corresponding to brightness and a standard parameter value a3 corresponding to contrast ratio, so as to eliminate unclear pictures caused by external conditions during the shooting of the sample pictures and improve the effectiveness of model training; and flipping each third picture in preset directions (such as horizontal and vertical directions), and twisting each third picture at a preset twisting angle (such as 30 degrees) to obtain a fourth picture corresponding to each third picture, i.e., each fourth picture is a training picture of a corresponding sample picture, wherein the role of flipping and twisting operations is to simulate various forms of pictures under actual business scenarios, and the scale of data sets can be increased through these flipping and twisting operations, thereby improving the authenticity and practicality of model training.

Assuming that the first classifier obtained through the above steps judges that the face image includes the eyeglasses, the face image is inputted into the predetermined second classifier. The eyeglass region in the face image is positioned and an eyeglass positioning result in the face image is outputted. It can be understood that if the face image does not include the eyeglass region in a judgment result outputted by the first classifier, the real-time image shot by the shooting apparatus 13 is obtained again and the subsequent steps are carried out.

It should be indicated that an acquiring process of the predetermined second classifier is as follows: preparing a preset quantity of sample pictures "with eyeglasses" to form a second sample set, or using the sample pictures marked using "with eyeglasses" or "1" in the first sample set in other embodiments. To simplify subsequent calculation, picture pretreatment is conducted on each sample picture. Specifically, the pretreatment step includes: converting each sample picture in the second sample set from a color image into a gray image; dividing the pixel value of each pixel point in the gray image by 255; standardizing the range of the pixel value of each pixel point from 0-255 to 0-1; and marking a preset quantity of marking points in the positions of the eyeglasses in the pretreated sample pictures, for example, marking 8 feature points on eyeglass frames in each sample picture: marking 3 feature points uniformly along an upper and a lower frames respectively, and marking 1 feature point respectively along a left and a right frames.

It is assumed that the second sample set has m sample pictures. The preset quantity of marking points that represent the positions of the eyeglasses in each sample picture are combined into a vector; and the vectors of all other (m−1) sample pictures are aligned with a reference vector by taking the vector in one sample picture as the reference vector to obtain a first average model about the position of the eyeglasses. PCA dimensionality reduction treatment is conducted on the first average model about the position of the eyeglasses to obtain a second average model about the position of the eyeglasses.

The local features (such as HOG features) of each marking point are extracted from the second average model through a feature extraction algorithm, and the second average model about the position of the eyeglasses and the local features of each marking point are taken as the second classifier. The feature extraction algorithm is the SIFT algorithm. The SIFT algorithm extracts the local features of each feature point from the second average model, selects one feature point as the reference feature point and finds a feature point with the same or similar local feature as that of the reference feature point (for example, a difference value of the local features of two feature points is within a preset range). This principle is followed until all lip feature points are found. In other embodiments, the feature extraction algorithm may also be the SURF algorithm, the LBP algorithm, the HOG algorithm and the like.

In the eyeglass positioning method proposed by the present embodiment, firstly, whether the face image includes eyeglasses is judged through the first classifier, and then the face image with eyeglasses is inputted into the second classifier to determine the position of the eyeglasses in the face image. The present embodiment adopts two classifiers to detect the images in the eyeglass regions in the face images independent of image edges, thereby enhancing precision and accuracy of eyeglass detection.

In addition, the embodiment of the present application also proposes a computer readable storage medium. The computer readable storage medium includes an eyeglass positioning program, and the eyeglass positioning program realizes the following operation when executed by the processor:

acquiring a real-time image shot by a shooting apparatus, and extracting a real-time face image from the real-time image using a face recognition algorithm;

recognizing whether the real-time face image includes eyeglasses using a predetermined first classifier, and outputting a recognition result; and positioning the eyeglasses in the real-time face image using a predetermined second classifier and outputting a positioning result when the recognition result is that the real-time face image includes the eyeglasses.

Preferably, a training process of the predetermined first classifier is as follows:

respectively preparing sample pictures with eyeglasses and sample pictures without eyeglasses, and classifying and marking each sample picture according to whether the sample picture includes the eyeglasses;

dividing the classified and marked sample pictures into a first proportion of training sets and a second proportion of verifying sets;

training a convolutional neural network using the training sets to obtain the first classifier; and verifying the accuracy rate of the trained first classifier by the verifying sets; ending the training if the accuracy rate is greater than or equal to a preset accuracy rate; or increasing the quantity of the sample pictures and re-executing the training step if the accuracy rate is less than the preset accuracy rate.

Preferably, an acquiring process of the predetermined second classifier is as follows:

pretreating the sample pictures with eyeglasses, and marking a preset quantity of marking points in the positions of the eyeglasses in the pretreated sample pictures;

combining the preset quantity of marking points that represent the positions of the eyeglasses in each sample picture into a vector; and aligning the vectors of all other sample pictures with a reference vector by taking the vector in one sample picture as the reference vector to obtain a first average model about the position of the eyeglasses;

conducting dimensionality reduction treatment on the first average model about the position of the eyeglasses to obtain a second average model about the position of the eyeglasses; and extracting the local features of each marking point from the second average model, and taking the second average model about the position of the eyeglasses and the local features of each marking point as the second classifier.

The specific implementation mode of the computer readable storage medium in the present application is roughly the same as that of the eyeglass positioning method mentioned above, and is not repeated herein.

It should be indicated that terms of "comprise", "include" or any other variant herein are intended to cover non-exclusive inclusion, so that a process, an apparatus, an article or a method which includes a series of elements not only includes such elements, but also includes other elements not listed clearly or also includes inherent elements in the process, the apparatus, the article or the method. Under the condition of no more limitation, the elements defined by a sentence "include one . . . " do not exclude additional identical elements in the process, the apparatus, the article or the method which includes the elements.

The serial numbers of the above embodiments of the present application are for the purpose of description only and do not represent the merits or demerits of the embodiments. By the description of the above embodiments, those skilled in the art can clearly understand that the method in each embodiment can be achieved in the manner of using software and a necessary common hardware platform, and of course, can also be achieved using hardware, but in many cases, the former is a better implementation. Based on such understanding, the technical solution of the present application can be reflected in a form of a software product in essence or in a part of making a contribution to the prior art. The computer software product is stored in a storage medium (such as, an ROM/RAM, a disc and a CD), including several instructions to enable one terminal device (which may be a mobile phone, a computer, a server or a network device, etc.) to execute the methods of various embodiments of the present application.

The above only describes preferred embodiments of the present application, but is not intended to limit the scope of patent of the present application. Any equivalent structure or equivalent flow transformation made by using contents of the description and drawings of the present application, or directly or indirectly used in other relevant technical fields shall be similarly included within the scope of patent protection of the present application.

What is claimed is:

1. An eyeglass positioning method, applied to an electronic apparatus and comprising:
   acquiring a real-time image shot by a shooting apparatus, and extracting a real-time face image from the real-time image using a face recognition algorithm;
   recognizing whether the real-time face image comprises eyeglasses using a predetermined first classifier, and outputting a recognition result; and
   positioning the eyeglasses in the real-time face image using a predetermined second classifier and outputting a positioning result when the recognition result is that the real-time face image comprises the eyeglasses, wherein an acquiring process of the predetermined second classifier is as follows:
   pretreating a plurality of sample pictures with eyeglasses, and marking a preset quantity of marking points in a position of the eyeglasses in each of the pretreated sample pictures;
   combining the preset quantity of marking points that represent the position of the eyeglasses in each sample picture into a vector; and aligning the vectors of all other sample pictures with a reference vector by taking the vector in one sample picture as the reference vector to obtain a first average model about the position of the eyeglasses;
   conducting dimensionality reduction treatment on the first average model about the position of the eyeglasses to obtain a second average model about the position of the eyeglasses; and
   extracting a plurality of local features of each marking point from the second average model, and taking the second average model about the position of the eyeglasses and the local features of each marking point as the second classifier.

2. The eyeglass positioning method of claim 1, wherein a training process of the predetermined first classifier is as follows:
   respectively preparing sample pictures with eyeglasses and sample pictures without eyeglasses, and classifying and marking each sample picture according to whether the sample picture comprises the eyeglasses;
   dividing the classified and marked sample pictures into a first proportion of training sets and a second proportion of verifying sets;
   training a convolutional neural network using the training sets to obtain the first classifier; and
   verifying an accuracy rate of the trained first classifier by the verifying sets; ending the training if the accuracy rate is greater than or equal to a preset accuracy rate; or increasing the quantity of the sample pictures and re-executing the training process if the accuracy rate is less than the preset accuracy rate.

3. The eyeglass positioning method of claim 2, wherein a step of pretreating each sample picture comprises:
   converting each sample picture into a gray image; reading a pixel value of each pixel point in each gray image; dividing the pixel value by 255; and standardizing the pixel value of each pixel point in each gray image.

4. A non-transitory computer readable storage medium, the computer readable storage medium comprising an eyeglass positioning program, and the eyeglass positioning program realizing, when executed by the processor, to implement all steps of the eyeglass positioning method of claim 3.

5. A non-transitory computer readable storage medium, the computer readable storage medium comprising an eyeglass positioning program, and the eyeglass positioning program realizing, when executed by the processor, to implement all steps of the eyeglass positioning method of claim 2.

6. The eyeglass positioning method of claim 1, wherein the face recognition algorithm is a geometrical feature-based method, a local feature analysis method, a feature face method, an elastic model-based method or a neural network method.

7. A non-transitory computer readable storage medium, the computer readable storage medium comprising an eyeglass positioning program, and the eyeglass positioning program realizing, when executed by the processor, to implement all steps of the eyeglass positioning method of claim 6.

8. A non-transitory computer readable storage medium, the computer readable storage medium comprising an eyeglass positioning program, and the eyeglass positioning program realizing, when executed by the processor, to implement all steps of the eyeglass positioning method of claim 1.

9. An electronic apparatus, the electronic apparatus comprising: a memory and a processor, wherein the memory stores an eyeglass positioning program and the eyeglass positioning program realizes, when executed by the processor, the following steps of:
   acquiring a real-time image shot by a shooting apparatus, and extracting a real-time face image from the real-time image using a face recognition algorithm;
   recognizing whether the real-time face image comprises eyeglasses using a predetermined first classifier, and outputting a recognition result; and
   positioning the eyeglasses in the real-time face image using a predetermined second classifier and outputting a positioning result when the recognition result is that the real-time face image comprises the eyeglasses, wherein an acquiring process of the predetermined second classifier is as follows:
   pretreating a plurality of sample pictures with eyeglasses, and marking a preset quantity of marking points in a position of the eyeglasses in each of the pretreated sample pictures;
   combining the preset quantity of marking points that represent the position of the eyeglasses in each sample picture into a vector; and aligning the vectors of all other sample pictures with a reference vector by taking the vector in one sample picture as the reference vector to obtain a first average model about the position of the eyeglasses;
   conducting dimensionality reduction treatment on the first average model about the position of the eyeglasses to obtain a second average model about the position of the eyeglasses; and
   extracting a plurality of local features of each marking point from the second average model, and taking the second average model about the position of the eyeglasses and the local features of each marking point as the second classifier.

10. The electronic apparatus of claim 9, wherein a training process of the predetermined first classifier is as follows:
    respectively preparing sample pictures with eyeglasses and sample pictures without eyeglasses, and classifying and marking each sample picture according to whether the sample picture comprises the eyeglasses;
dividing the classified and marked sample pictures into a first proportion of training sets and a second proportion of verifying sets;
training a convolutional neural network using the training sets to obtain the first classifier; and
verifying an accuracy rate of the trained first classifier by the verifying sets; ending the training if the accuracy rate is greater than or equal to a preset accuracy rate; or increasing the quantity of the sample pictures and re-executing the training process if the accuracy rate is less than the preset accuracy rate.

11. The electronic apparatus of claim 10, wherein a step of picture pretreatment for each sample picture comprises:
converting each sample picture into a gray image;
reading a pixel value of each pixel point in each gray image;
dividing the pixel value by 255; and
standardizing the pixel value of each pixel point in each gray image.

* * * * *